United States Patent
Knigge et al.

(10) Patent No.: US 8,817,413 B1
(45) Date of Patent: Aug. 26, 2014

(54) DISK LUBRICANT MANAGEMENT IN DATA STORAGE DEVICE

(71) Applicant: Western Digital Technologies, Inc., Irvine, CA (US)

(72) Inventors: Bernard E. Knigge, San Jose, CA (US); David E. Wachenschwanz, Saratoga, CA (US); Min Yang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/034,427

(22) Filed: Sep. 23, 2013

Related U.S. Application Data (60) Provisional application No. 61/856,398, filed on Jul. 19, 2013.

(51) Int. Cl.
*G11B 21/02* (2006.01)

(52) U.S. Cl.
USPC .......................................... 360/75; 360/78.08

(58) Field of Classification Search
None
See application file for complete search history.

(56) References Cited

U.S. PATENT DOCUMENTS

| | | | |
|---|---|---|---|
| 4,490,766 A | 12/1984 | Hill et al. | |
| 5,850,321 A | 12/1998 | McNeil et al. | |
| 6,307,703 B1 * | 10/2001 | Moriya et al. | 360/75 |
| 6,356,405 B1 | 3/2002 | Gui et al. | |
| 6,493,168 B1 | 12/2002 | French et al. | |
| 6,493,184 B1 | 12/2002 | Smith | |
| 6,760,175 B2 | 7/2004 | Smith | |
| 6,853,508 B2 | 2/2005 | Smith et al. | |
| 6,900,957 B2 | 5/2005 | Gillis et al. | |
| 7,002,768 B2 | 2/2006 | Marchon et al. | |
| 7,609,473 B1 | 10/2009 | Mate | |
| 7,724,463 B2 | 5/2010 | Nakamura et al. | |
| 7,817,370 B2 | 10/2010 | Cromer et al. | |
| 7,914,845 B2 | 3/2011 | Reiter | |
| 8,068,306 B2 | 11/2011 | Ramamoorthy et al. | |
| 2003/0086200 A1 * | 5/2003 | Tokizono et al. | 360/78.08 |
| 2005/0286150 A1 * | 12/2005 | Baumgart et al. | 360/75 |
| 2009/0109573 A1 * | 4/2009 | Li et al. | 360/235.5 |
| 2009/0128951 A1 * | 5/2009 | Guo | 360/86 |

* cited by examiner

*Primary Examiner* — Thang Tran (57) ABSTRACT

It is determined whether one or more heads of a data storage device (DSD) have been within a radial position of one or more disks of the DSD for more than a threshold period of time. When it is determined that the one or more heads have been within a radial position of the one or more disks for more than the threshold period of time, the one or more heads are radially moved by more than a predetermined distance to reduce a development of variations in a distribution of lubricant on a first surface of the one or more disks.

23 Claims, 9 Drawing Sheets

DISK LUBRICANT MANAGEMENT IN DATA STORAGE DEVICE

CROSS-REFERENCE TO RELATED APPLICATION

This application claims the benefit of U.S. Provisional Application No. 61/856,398, filed on Jul. 19, 2013, which is hereby incorporated by reference in its entirety.

BACKGROUND

Data storage devices (DSDs) are often used to record data on or to reproduce data from a recording media. Such recording media can include one or more rotating magnetic disks for storing data and a slider with a magnetic head can be actuated over the disk to magnetically write data on and read data from a surface of the disk. During normal operation, the slider floats over the disk surface at an appropriate distance or "fly height" above the disk surface due to airflow between the slider and the disk surface. This airflow is mostly generated by the spinning of the disk. A thin layer of lubricant is typically applied to the disk surface to reduce unwanted interactions between the slider and the disk.

In order to allow for more data to be stored in a given area on a disk surface, the recording density of disk surfaces continues to increase in the data storage industry. One approach to increasing recording density has been to increase the number of tracks storing data on the disk surface to result in a higher number of tracks per inch (TPI) on the disk surface.

As the amount of data stored in a given area of the disk surface increases, the distance between the slider and the disk surface generally decreases to facilitate more accurate reading and writing of the data. In this regard, current DSDs may only have a few nanometers between the slider and the disk surface. This decreased distance between the slider and the disk surface has also decreased the distance between the layer of lubricant on the disk and the slider. This has led to an undesirable increase in the accumulation of lubricant on the slider and to undesirable variations in the distribution of lubricant on the disk surface.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
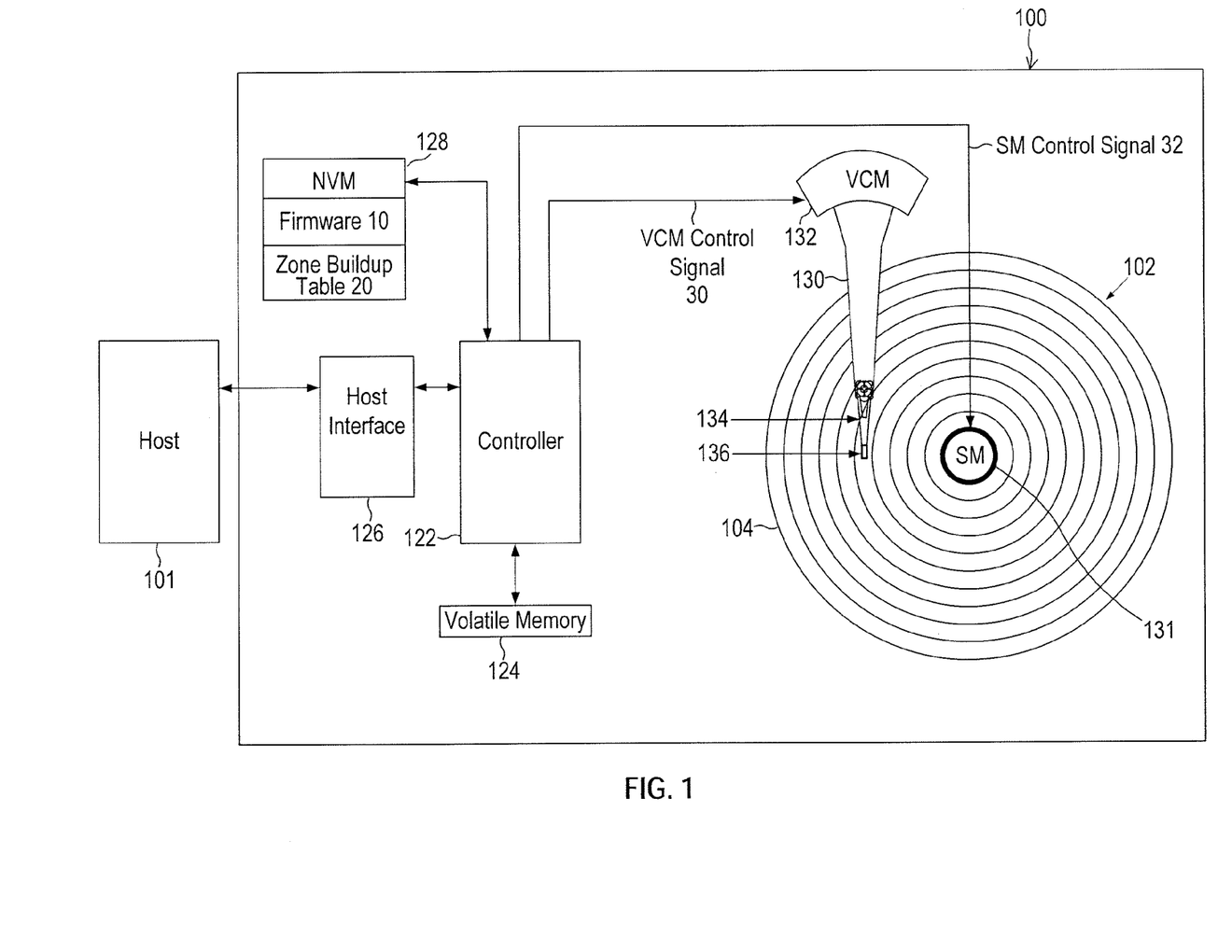
FIG. 1 is a block diagram depicting a data storage device (DSD) according to an embodiment.

FIG. 1 illustrates a block diagram of data storage device (DSD) 100 according to one example embodiment. Those of ordinary skill in the art will appreciate that DSD 100 can include more or less than those elements shown in FIG. 1.

As shown in FIG. 1, DSD 100 includes controller 122 which can perform various operations of DSD 100 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Figure 6:
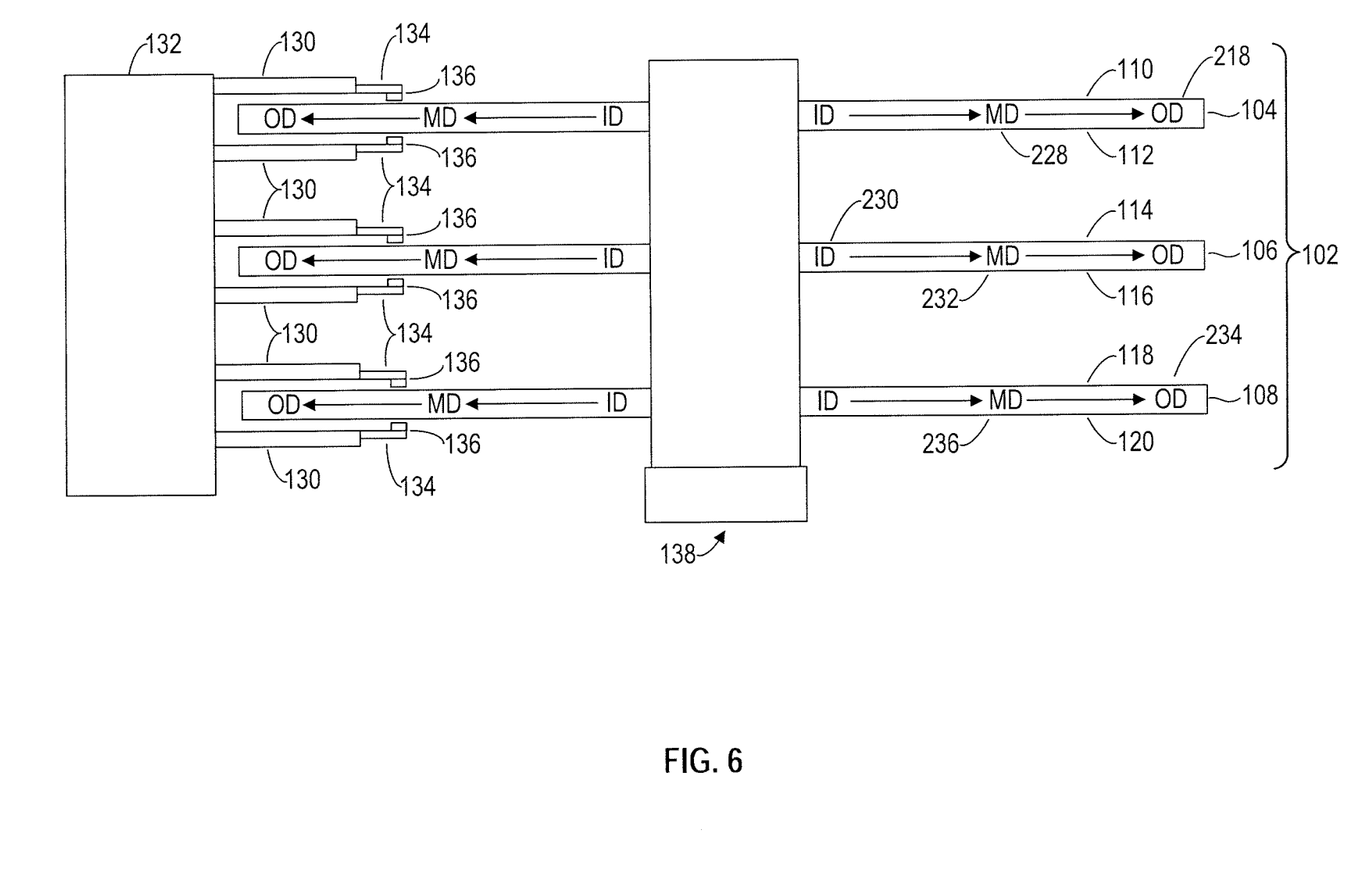
FIG. 6 depicts a side view of a disk pack and head gimbal assembly (HGA) according to an embodiment.

In the example of FIG. 1, DSD 100 includes disk pack 102 which includes rotating magnetic disk 104 and rotating magnetic disks 106 and 108 located beneath disk 104 as shown in FIG. 6. The disks of disk pack 102 rotate about spindle motor (SM) 131, which is controlled by controller 122 via SM control signal 32.

DSD 100 also includes head gimbal assembly (HGA) 134 connected to the distal end of actuator 130 which is rotated by voice coil motor (VCM) 132 to radially position slider 136 in relation to a surface of disk 104. As shown in FIG. 6, HGA 134 is arranged to position a slider 136 in proximity to a corresponding disk surface of disks 104, 106 and 108. Controller 122 controls VCM 132 to radially move sliders 136 in relation to the disk surfaces of disk pack 102 via VCM control signal 30 (e.g., control current).

Figure 3:
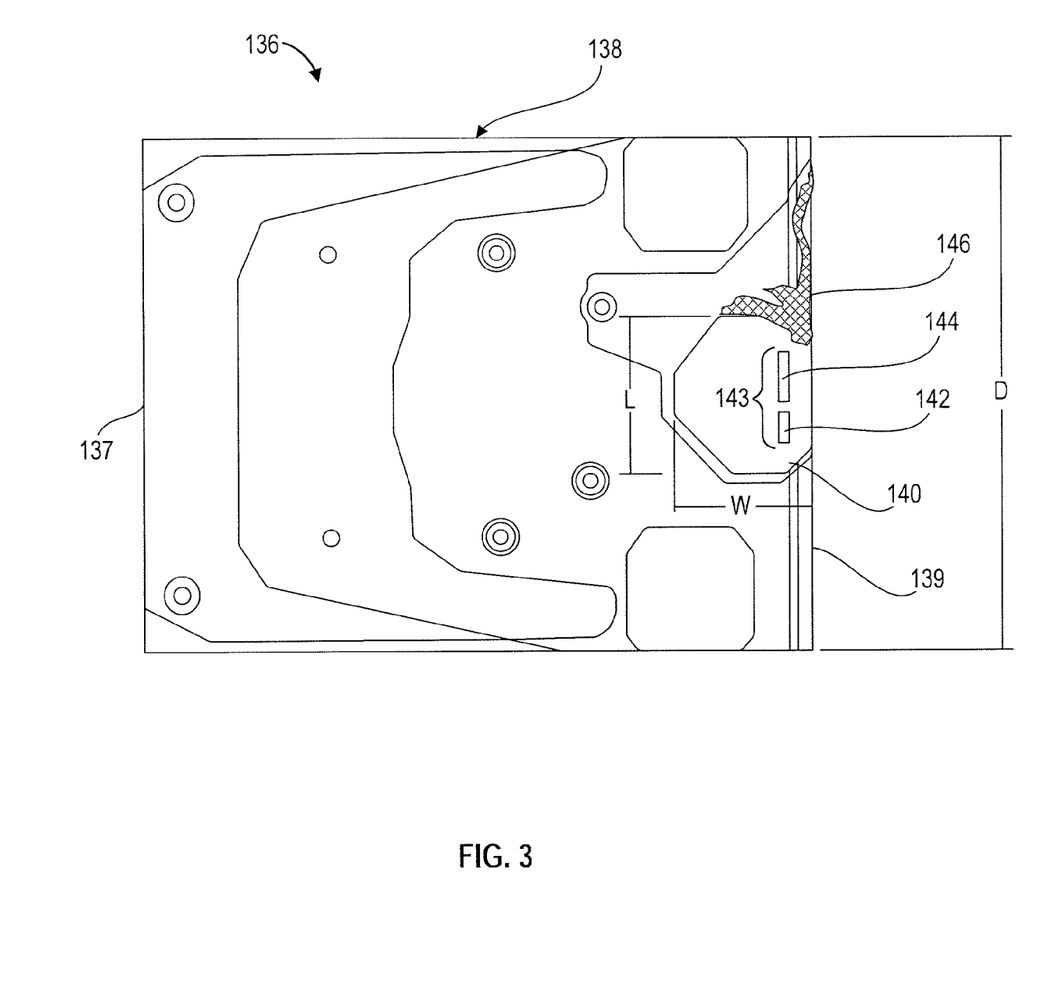
FIG. 3 depicts a view of an air bearing surface (ABS) of the slider of FIGS. 2A and 2B according to an embodiment.

In addition, controller 122 causes a head (e.g., head 143 in FIG. 3) on slider 136 to magnetically write data on a disk surface during a write operation using a write element (e.g., write element 144 in FIG. 3). Controller 122 also causes the head on slider 136 to read data from a disk surface during a read operation using a read element (e.g., read element 142 in FIG. 3). Such write and read operations may be in response to commands from host 101 received via host interface 126.

With reference to FIG. 1, DSD 100 also includes solid-state non-volatile memory (NVM) 128 for storing data, for example, for use as a cache or as part of a Solid State Hybrid Drive (SSHD) implementation. NVM 128 stores firmware 10 which can include computer-readable instructions used by DSD 100 to implement the lubricant redistribution and management processes described below. NVM 128 may also optionally store zone buildup table 20 which can be used as part of a lubricant redistribution process as described below with reference to FIG. 7.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Volatile memory 124 can be a volatile solid state memory and can include, for example, a DRAM. Data stored in volatile memory 124 can include data read from disks 104, 106 and/or 108, data to be written on disks 104, 106 and/or 108, and/or instructions for DSD 100, such as instructions loaded into volatile memory 124 from firmware 10 for execution by controller 122.

Host interface 126 is configured to interface DSD 100 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 122. Although FIG. 1 depicts the co-location of host 101 and DSD 100, in other embodiments the two need not be physically co-located. In such embodiments, DSD 100 may be located remotely from host 101 and connected to host 101 via a network interface or DSD 100 may serve as a stand-alone DSD without host 101.

Figure 2A:
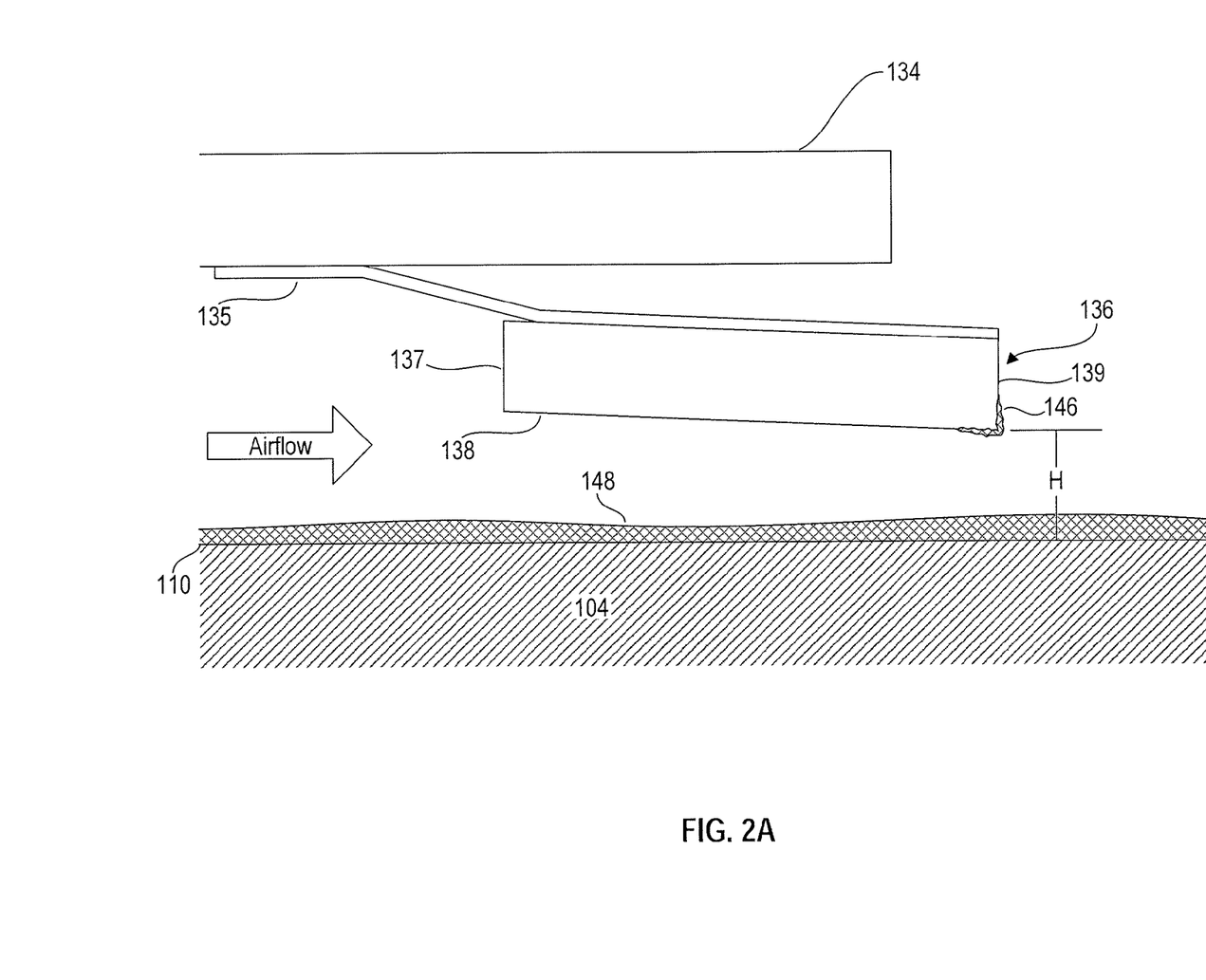
FIG. 2A depicts a close-up side view of a disk surface and slider according to an embodiment.

FIG. 2A depicts a close-up side view of slider 136 floating over disk surface 110 of disk 104 according to one embodiment. As shown in FIG. 2A, slider 136 is connected to HGA 134 by elastic head flexure 135 which supports slider 136 on HGA 134. Slider 136 includes leading edge 137, air bearing surface (ABS) 138, and trailing edge 139. Airflow moves in the direction indicated by the arrow and leading edge 137 encounters airflow before trailing edge 139, which floats over disk surface 110 at a fly height of H.

Figure 2B:
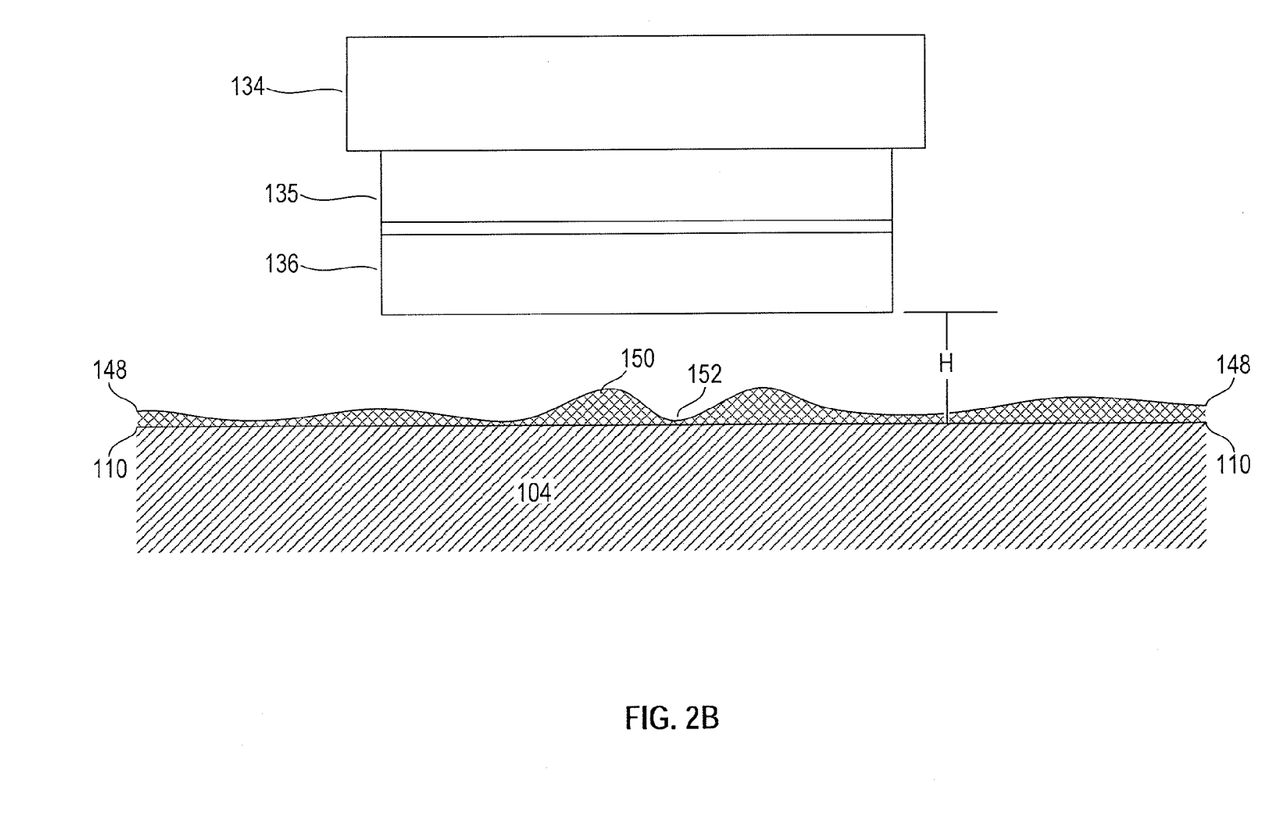
FIG. 2B depicts a close-up front view of the disk surface and slider of FIG. 2A according to an embodiment.

In addition, FIG. 2A shows a layer of lubricant 148 on disk surface 110. Lubricant 148 can be any disk surface lubricant, such as a perfluoroplyether (PFPE) lubricant. As shown in the example of FIG. 2B, lubricant 148 has a varying distribution along disk surface 110 with mounds or ripples such as mogul 150 and depleted areas such as depleted area 152. Lubricant 148 may range from a thickness of 0.6 nanometers (nm) to 2.0 nm from disk surface 110 toward ABS 138 of slider 136. Such variations in the distribution of lubricant 148 can cause instability in the fly height H which can adversely affect the accuracy in reading and writing data by a head (e.g., head 143 in FIG. 3) of slider 136.

The development of variations in the distribution of lubricant 148 can be due to several different factors such as forces from air pressure, electrostatic forces, and/or intermolecular forces. The rate at which such variations develop can depend on factors such as an angular velocity of disk 104, the design of slider 136 (e.g., the use of localized heating for dynamic fly height or a configuration of ABS 138), and properties of lubricant 148 such as bonding properties. In particular, the rate of development of variations in distribution can be especially associated with the length of time slider 136 dwells within a radial position over disk surface 110. In other words, the longer slider 136 remains within a radial position over disk surface 110, the more pronounced the variations ordinarily become in lubricant distribution.

In addition, the close proximity of slider 136 to lubricant 148 can result in an accumulation of lubricant 148 on slider 136 near trailing edge 139 as shown by accumulated lubricant 146 in FIG. 2A. As with the variations in lubricant distribution on disk surface 110, the accumulation of lubricant on slider 136 may be due to forces from air pressure, electrostatic forces, and/or intermolecular forces in addition to a length of time that slider 136 dwells in a radial area of disk surface 110.

FIG. 3 depicts a view of an example configuration of ABS 138 of slider 136 according to an embodiment. As shown in FIG. 3, accumulated lubricant 146 has formed along trailing edge 139 in proximity to trailing pad 140 where read element 142 and write element 144 are located. The accumulation of lubricant such as accumulated lubricant 146 can cause reliability issues with DSD 100 and shorten the useful life of slider 136.

In the example of FIG. 3, slider 136 has a width of D and sizes of trailing pad 140 are denoted with a width W and a length L. One example of distances for W and L for current trailing pad designs can be within a range of 60 to 120 microns. In other implementations, trailing pad 140 may have a different shape or a different area with respect to the overall area of ABS 138 resulting from different widths and/or lengths for trailing pad 140.

In accordance with the present disclosure, the development of variations in the distribution of lubricant 148 and the accumulation of lubricant 148 on slider 136 can ordinarily be reduced with frequent radial movement of head 143 by more than a predetermined distance. The predetermined distance can be determined based upon characteristics of ABS 138. In one embodiment, the predetermined distance can be based on a size of slider 136, such as a distance of slider width D. In another embodiment, the predetermined distance can be based on a size of trailing pad 140 such as a distance of at least width W or length L of trailing pad 140. In this regard, variations in the distribution of lubricant 148, such as mogul 150 and depletion area 152, can build up in a period of several seconds to several minutes of head 143 remaining within the same radial position relative to disk surface 110. Thus, the lubricant redistribution and management processes described below provide example embodiments for increasing the frequency of radial movements of head 143.

Figure 4:
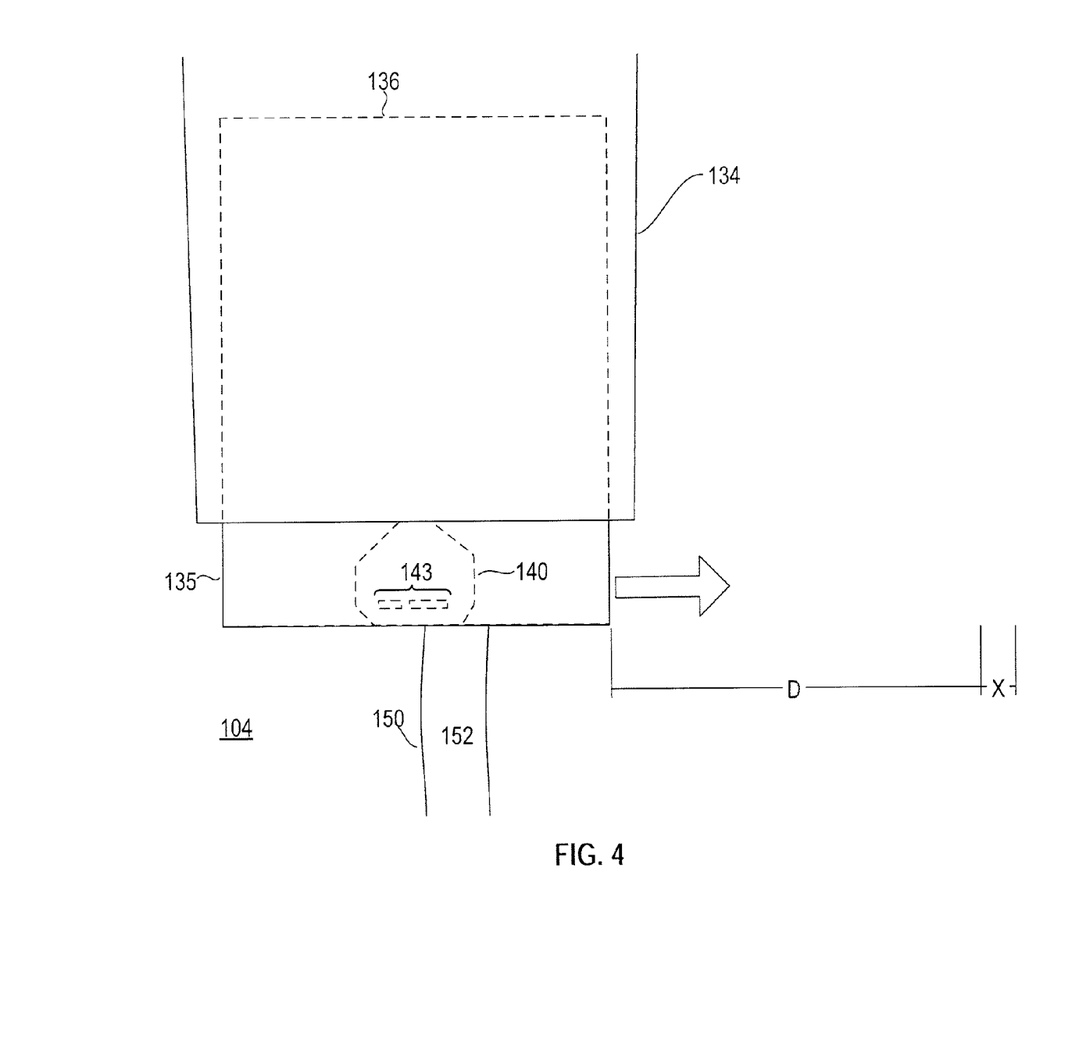
FIG. 4 depicts a top view of the slider and disk surface of FIGS. 2A and 2B according to an embodiment.

FIG. 4 depicts a top view of slider 136 and disk 140 according to an embodiment. As shown in FIG. 4, head 143 is moved by D, the width of slider 136, plus an additional distance X when head 143 has been within a radial position of disk 104 for more than a threshold period of time. Such radial movement can ordinarily reduce the development of variations in lubricant distribution such as mogul 150 and depletion area 152.

Distance X can accommodate for a skew angle between slider 136 and radial positions on disk surface 110 near the inner and outer diameters of disk 104 to make sure that head 143 moves by at least a distance of the slider width D with respect to a radial position on disk surface 110. Other embodiments may involve moving head 143 by at least a predetermined distance based on the size of trailing pad 140, such as by a distance of at least trailing pad length L. As noted above, the predetermined distance can be based upon specific designs for an ABS, specific fly heights, and/or characteristics of the lubricant.

The head remaining within the same radial position is especially an issue for shingled magnetic recording (SMR) where writing is generally performed sequentially, thereby making it more likely that the head will remain within substantially the same radial position. However, the techniques and processes discussed in the present disclosure can also be applied to non-shingle drives.

SMR has recently been introduced as a way of increasing the number of tracks per inch (TPI) by making the tracks narrower. SMR increases TPI by using a relatively wide write element such as write element 144 with a stronger magnetic field to overlap tracks like roof shingles. The non-overlapping portion of the track then serves as a narrow track that can be read by a narrower read element such as read element 142.

Figure 5:
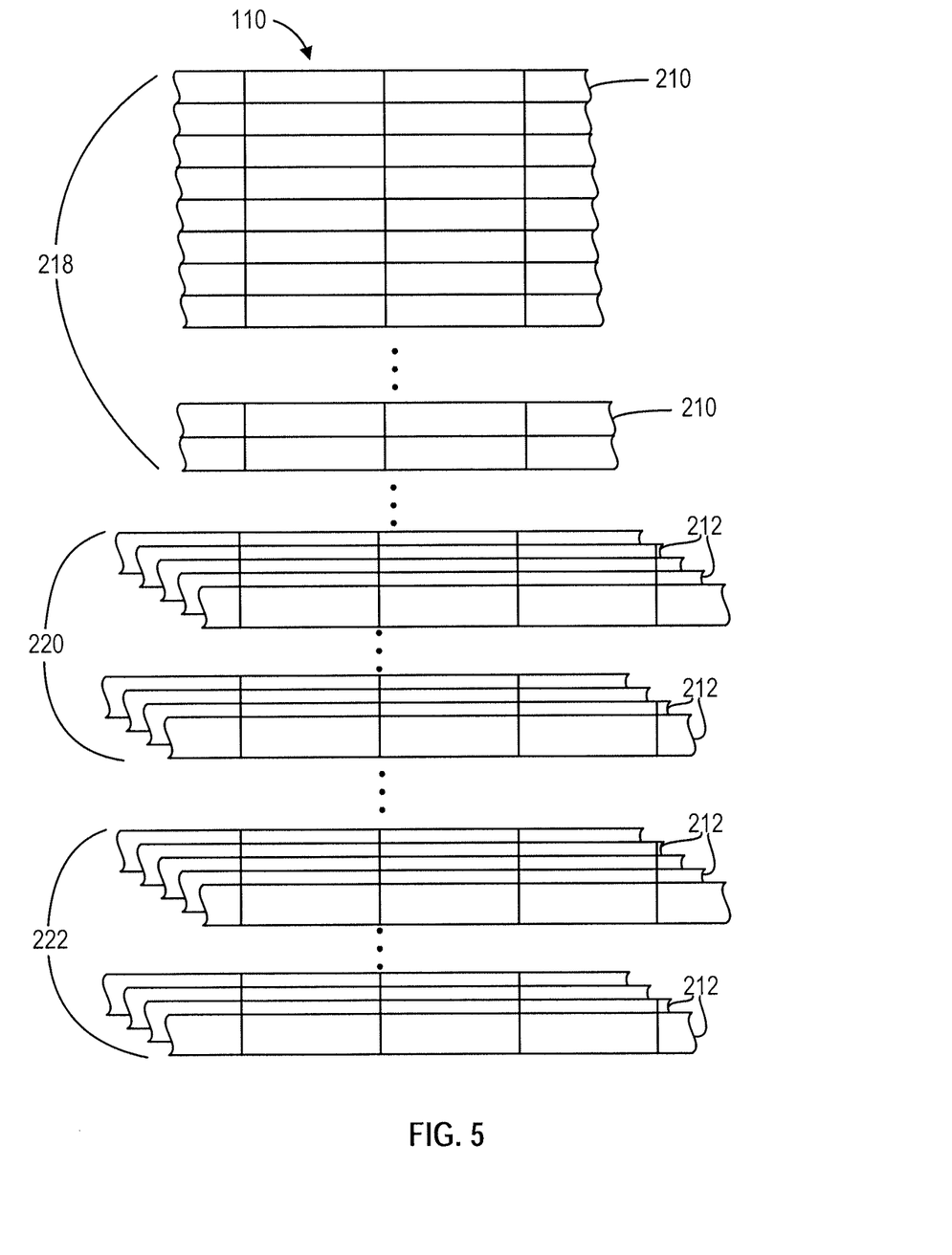
FIG. 5 illustrates an example of zones of tracks on a disk surface according to an embodiment.

FIG. 5 illustrates an example portion of disk surface 110 depicting one zone of non-overlapping tacks 210 written by write element 144 and two zones of overlapping SMR tracks 212 written by write element 144. Zones of non-overlapping tracks, such as zone 218, are referred to herein as a conventional magnetic recording (CMR) zones. In the example of FIG. 5, CMR zone 218 is a reserved zone which is frequently written by write element 144 and/or frequently read by read element 142. A reserved zone such as CMR zone 218 may include file system data which may need to be frequently accessed or modified.

Each of SMR zones 220 and 222 can, for example, include thousands of tracks 212. In one example, SMR zones 220 and 222 include between 2,000 to 3,000 tracks resulting in a radial width on disk surface 110 of approximately 100 to 200 microns for each of SMR zones 220 and 222. With such SMR zones, slider 136 may remain in the SMR zone for several minutes during a write operation before moving to a new zone due in part to the sequential writing of overlapping tracks 212.

The non-overlapping portions of tracks 212 in SMR zones 220 and 222 form relatively narrow tracks that can be read by read element 142. Accordingly, SMR zones 220 and 222 have a higher number of TPI than CMR zone 218.

As discussed above, SMR zones are generally sequentially written due to the overlapping of tracks. In more detail, without sequentially writing an SMR zone, the overlapping of tracks can create a problem since new writes to a previously overlapped track would also affect data written in the overlapping track.

However, this sequential writing can keep head 143 and slider 136 in substantially the same radial location (within 100 microns in one example) for long periods of time during write operations and can lead to increased variations in the distribution of lubricant 148 and lead to the accumulation of lubricant 148 on slider 136.

To make matters worse, the order of writing SMR zones often follows a "serpentine" pattern where upon completion of writing an SMR zone on one disk surface, an SMR zone is then sequentially written in the same radial proximity as the completed SMR zone but on a different disk surface in the disk pack. This serpentine order of writing SMR zones further prolongs the amount of time the slider remains within substantially the same radial position in the disk pack.

As shown in FIG. 6, one aspect of the present disclosure includes moving the head after completing writing of a zone to a radial location outside of the completed zone. FIG. 6 illustrates one example of such a write order where writing begins on disk surface 110 of disk 104 at an inner diameter (ID) location and proceeds in the direction of the arrows to a middle diameter (MD) location on the same disk and ends at an outer diameter (OD) location of the disk before beginning writing at the ID location of the next disk surface 112. In other words, head 143 is not allowed to remain in the same radial proximity after completion of writing a zone. In other embodiments, writing could take place on a different disk surface before writing toward the OD on the same disk surface as long as the next zone is radially located away from the completed zone by at least a predetermined distance. Such a predetermined distance can be based on a size of slider 136 or trailing pad 140. In yet other embodiments, the direction of writing on disk surfaces 110, 112, 114, 116, 118 and 120 may proceed from the OD location toward the ID location (i.e., in the opposite direction indicated by the arrows in FIG. 6).

In addition, FIG. 6 illustrates the locations of reserved zones 218, 228, 230, 232, 234 and 236 on disk surfaces 110, 112, 114, 116, 118 and 120, respectively. The reserved zones are usually frequently written to and/or frequently read by the heads. These reserved zones, as in the case of zone 218, may be CMR zones with non-overlapping tracks 210 where data does not need to be sequentially written and can therefore be more easily modified.

As shown in FIG. 6, the radial location of reserved zones 218, 228, 230, 232, 234 and 236 varies from disk surface to disk surface in an effort to increase the frequency of radial movement of the heads on sliders 136. More specifically, reserved zones 218 and 234 are located near OD locations, reserved zones 228, 232, and 236 are located near MD locations, and reserved zone 230 is located near an ID location. By positioning the frequently accessed reserved zones at different radial locations, it is ordinarily possible to further reduce head dwell times near particular radial locations of disk pack 102. For example, if each of the reserved zones were located near an OD location, variations in the distribution of lubricant on the disk surfaces may increase near the OD of each disk surface.

Figure 7:
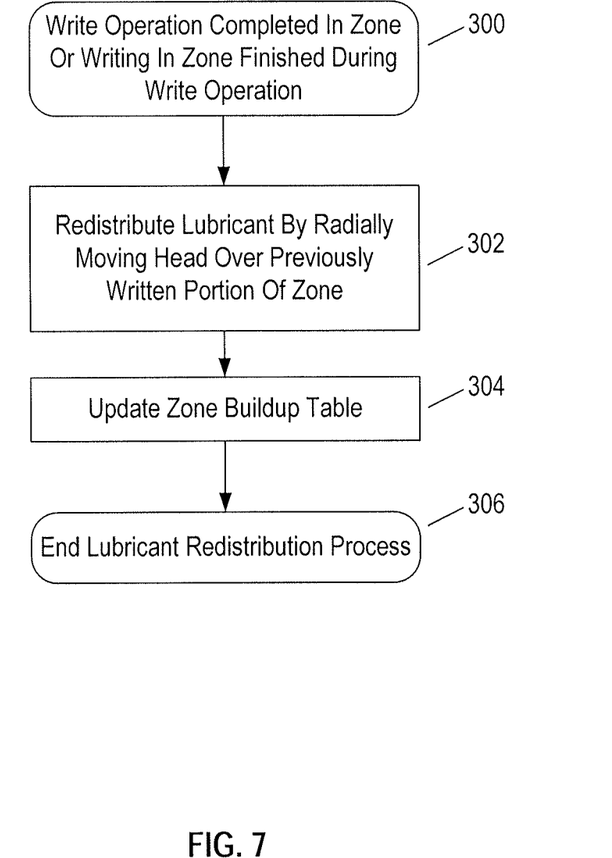
FIG. 7 is a flowchart for a lubricant redistribution process according to an embodiment.

FIG. 7 is a flowchart for a lubricant redistribution process which can be performed by controller 122 according to one embodiment. The redistribution process begins in block 300 with the completion of a write operation in a zone such as SMR zones 220 or 222. Although the process of FIG. 7 is particularly useful for SMR zones, the process of FIG. 7 can also be applied to CMR zones.

In block 302, controller 122 controls VCM 132 to radially move head 143 (e.g., performs a fast seek) over the previously written area of the zone by using VCM control signal 30 to actuate VCM 132. In one embodiment, head 143 is radially moved by more than a predetermined distance based on a size of slider 136. In other embodiments, controller 122 controls VCM 132 to radially move head 143 back and forth over the previously written portion several times to further smooth the lubricant.

In block 304, controller 122 may optionally update zone buildup table 20 stored in NVM 128 to log the redistribution of lubricant performed by the radial movement of head 143 in block 302. In this regard, zone buildup table 20 can record a count per zone of the number of lubricant redistribution operations performed per zone and also include an indication of how much of the zone has been written. Controller 122 may perform the radial movement of block 302 as a background activity for certain written zones based on zone buildup table 20.

The lubricant redistribution process of FIG. 7 then ends in block 306.

Figure 8:
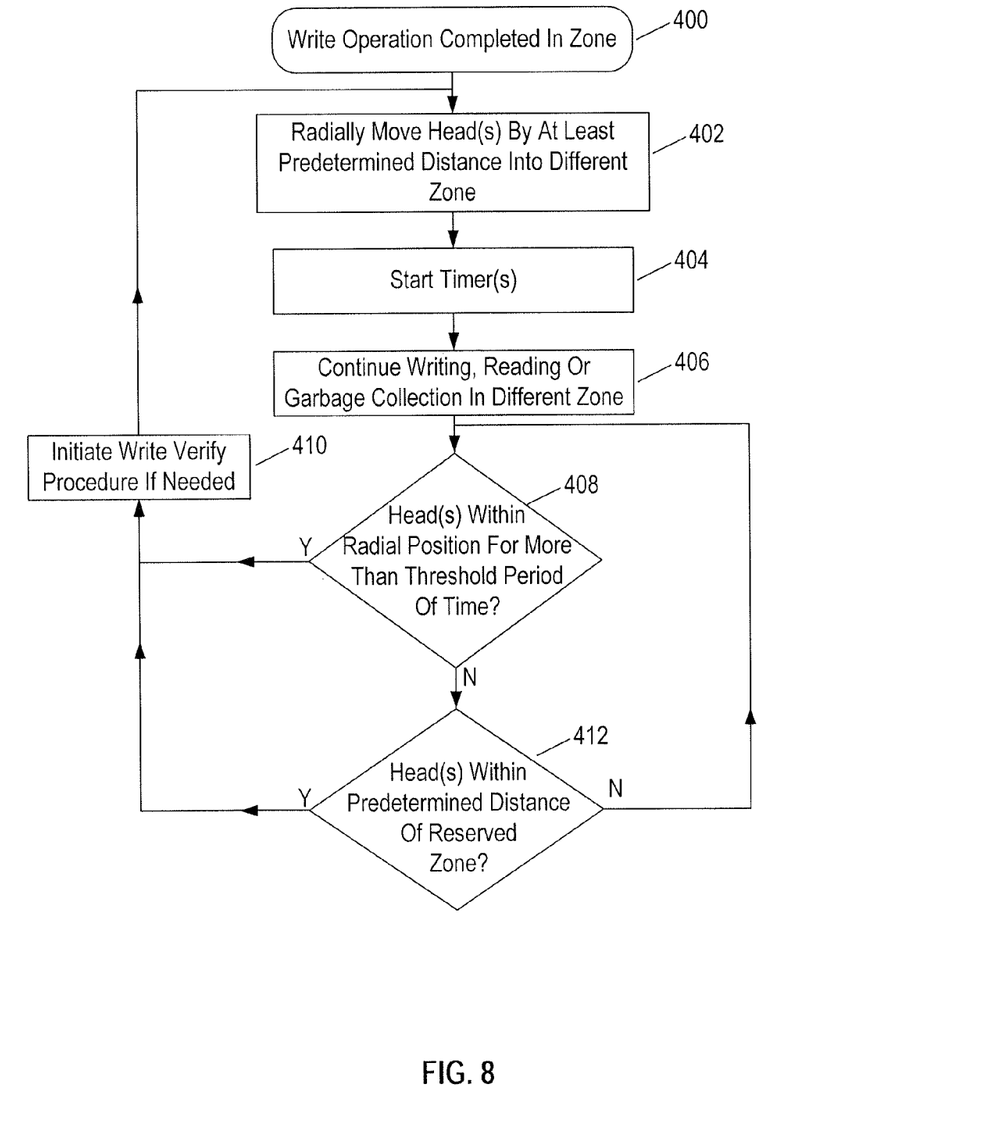
FIG. 8 is a flowchart for a lubricant management process according to an embodiment.

FIG. 8 is a flowchart for a lubricant management process which can be performed by controller 122 according to one embodiment. The process begins in block 400 with the completion of a write operation in a zone such as SMR zones 220 or 222. As with the redistribution process of FIG. 7, the lubricant management process of FIG. 8 is not limited to SMR zones and can be applied to CMR zones.

In block 402, controller 122 controls VCM 132 to radially move one or more heads, such as head 143, by at least a predetermined distance into a different zone. As discussed above with reference to FIG. 6, in embodiments with a disk pack, such as disk pack 102, the dwell time of each head can be affected by an operation performed by one of the heads in the HGA. In such embodiments, all of the heads in the HGA are radially moved in block 402 to reduce variations in lubricant on each of the disk surfaces in the disk pack. In embodiments where only a single disk surface is accessed by a single head, the head is radially moved by at least the predetermined distance into a different zone in block 402.

The predetermined distance can be based on a size of slider 136, such as distances D, W or L in FIG. 3. In one implementation, the one or more heads are radially moved by at least a length L of trailing pad 140 into a different zone where L is at least 60 microns. In other implementations, the one or more heads are moved by the width W of slider 136 or by W plus an additional distance X. The different zone may be the next adjacent zone in an OD or ID direction from a current zone or the different zone may be multiple zones away from the current zone in an OD or ID direction.

In block 404, controller 122 starts a timer or multiple timers to keep track of the dwell time of the one or more heads in relation to their respective disk surfaces. In one implementation, a shorter timer can be set when a head is performing a read or write operation than when the head is not performing a read or write operation. A shorter timer may be used in implementations where the head floats at a lower fly height over its corresponding disk surface during read and write operations than at other times.

In block 406, writing, reading or garbage collection is continued in the different zone. As understood by those of ordinary skill in the art, garbage collection can be a background process performed by DSDs to relocate valid data and free space on the disk surface for data that is no longer valid due to the data having been erased or modified. Accordingly, garbage collection often involves reading valid data and rewriting the valid data to a new location and can include performing read and write operations.

In block 408, controller 122 can use the timer or timers set in block 404 to determine whether the one or more heads have been within a radial position for more than a threshold period of time. In one implementation, a timer set in block 404 may continue to run (i.e., count down or count up) while a head remains within a particular zone or within a certain number of tracks until the threshold period of time is reached. The threshold period of time can be set in consideration of the time for distribution variations of the lubricant to develop and performance specifications for DSD 100 such as a number input/output operations per second (IOPS). As noted above, the rate at which variations develop in the lubricant can be based on several different factors in addition to the dwell time of the head. Such additional factors can include an angular velocity of the disk, the design of slider 136, and properties of the lubricant. In one implementation, the threshold period of time can be set to 10 seconds.

If it is determined in block 408 that the one or more heads have been within a radial position for more than the threshold period of time, controller 122 may optionally initiate a write verify procedure if needed to check that data of a write operation has been written. The process then returns to block 402 to radially move the one or more heads by at least the predetermined distance into another different zone.

On the other hand, if it is determined in block 408 that the one or more heads have not been within a radial position for more than the threshold period of time, controller 122 determines whether the one or more heads are within the predetermined distance of a reserved zone such as zone 218 on disk surface 110. If so, the process proceeds to block 410 if needed before returning to block 402 to radially move the one or more heads by more than the predetermined distance. Since the reserved zones are usually frequently accessed, block 412 ordinarily prevents further dwell time of the one or more heads in the proximity of the reserved zones so as to reduce variations in the distribution of the lubricant.

If the one or more heads are not within a reserved zone by the predetermined distance, the process returns to block 408 to determine whether the one or more heads have been within a radial position for more than the threshold period of time.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) comprising:
one or more disks including a first surface for storing data, the first surface having a lubricant distributed thereon;
one or more heads for writing data on the one or more disks and for reading data from the one or more disks;
a voice coil motor (VCM) for radially moving the one or more heads in relation to the one or more disks; and
a controller configured to:
determine whether the one or more heads have been within a radial position of the one or more disks for more than a threshold period of time; and
when it is determined that the one or more heads have been within the radial position of the one or more disks for more than the threshold period of time, control the VCM to radially move the one or more heads by more than a predetermined distance to reduce a development of variations in the distribution of the lubricant on the first surface.

2. The DSD of claim 1, further comprising one or more sliders with each of the one or more heads located on a respective slider, and wherein the predetermined distance is based on a size of the one or more sliders.

3. The DSD of claim 2, wherein each of the one or more heads is located on a trailing pad of a respective slider, and wherein the predetermined distance is based on a size of the trailing pad.

4. The DSD of claim 3, wherein the predetermined distance is equal to a length or a width of the trailing pad.

5. The DSD of claim 1, wherein the threshold period of time is based on a time for variations in the distribution of the lubricant to develop on the first surface while the one or more heads are within a radial position in relation to the first surface.

6. The DSD of claim 1, wherein the controller is further configured to:
cause a head of the one or more heads to write data on the first surface in at least one zone of tracks during a write operation; and
control the VCM to radially move the head outside of the at least one zone by at least the predetermined distance in response to a completion of the write operation in the at least one zone to reduce the development of variations in the distribution of the lubricant on the first surface.

7. The DSD of claim 1, wherein the one or more disks include a second surface for storing data with the second surface in alignment with and parallel to the first surface,
wherein the first surface includes a first reserved zone of tracks for storing frequently accessed data and the second surface includes a second reserved zone of tracks for storing frequently accessed data, and
wherein the first reserved zone is radially positioned away from the second reserved zone by at least the predetermined distance.

8. The DSD of claim 1, wherein the controller is further configured to redistribute lubricant on the first surface by controlling the VCM to radially move a head of the one or more heads across a previously written portion of the first surface multiple times in succession in response to a completion of a write operation in the previously written portion of the first surface.

9. The DSD of claim 1, wherein the first surface includes a first reserved zone of tracks for storing frequently accessed data, and wherein the controller is further configured to:
determine whether a head of the one or more heads is within the predetermined distance from the first reserved zone; and
when it is determined that the head is within the predetermined distance from the first reserved zone, control the VCM to radially move the head away from the first reserved zone by at least the predetermined distance.

10. The DSD of claim 1, wherein the controller is further configured to:
perform a write operation by causing a head of the one or more heads to write data in a zone of tracks on the first surface; and
in response to finishing the writing of data in the zone of tracks during the write operation, redistribute the lubricant in the finished zone of tracks by controlling the VCM to radially move the head across the finished zone of tracks before continuing the write operation in a different zone of tracks.

11. The DSD of claim 10, wherein the controller is further configured to control the VCM to radially move the head across the finished zone of tracks multiple times in succession before continuing the write operation in the different zone of tracks.

12. The DSD of claim 10, wherein the controller is further configured to log a redistribution of lubricant for the finished zone of tracks.

13. A method for operating a data storage device (DSD), the method comprising:
determining whether one or more heads of the DSD have been within a radial position of one or more disks of the DSD for more than a threshold period of time; and
when it is determined that the one or more heads have been within a radial position of the one or more disks for more than the threshold period of time, radially moving the one or more heads by more than a predetermined distance to reduce a development of variations in a distribution of lubricant on a first surface of the one or more disks.

14. The method of claim 13, wherein each of the one or more heads is located on a respective slider of one or more sliders, and wherein the predetermined distance is based on a size of the one or more sliders.

15. The method of claim 14, wherein each of the one or more heads is located on a trailing pad of the respective slider, and wherein the predetermined distance is based on a size of the trailing pad.

16. The method of claim 15, wherein the predetermined distance is equal to a length or a width of the trailing pad.

17. The method of claim 13, wherein the threshold period of time is based on a time for variations to develop in the distribution of the lubricant on the first surface while a head of the one or more heads is within a radial position in relation to the first surface.

18. The method of claim 13, further comprising:
writing data on the first surface in at least one zone of tracks using a head of the one or more heads during a write operation; and
radially moving the head outside of the at least one zone by at least the predetermined distance in response to a completion of the write operation in the at least one zone to reduce the development of variations in the distribution of the lubricant on the first surface.

19. The method of claim 13, wherein the first surface includes a first reserved zone of tracks for storing frequently accessed data, and wherein the method further comprises:
determining whether a head of the one or more heads is within the predetermined distance from the first reserved zone; and
when it is determined that the head is within the predetermined distance from the first reserved zone, radially moving the head away from the first reserved zone by at least the predetermined distance.

20. The method of claim 13, further comprising:
performing a write operation using a head of the one or more heads to write data on a portion of the first surface; and in response to the completion of the write operation, redistributing the lubricant in the portion of the first surface by radially moving the head across the portion of the first surface multiple times in succession.

21. The method of claim 13, further comprising:
performing a write operation using a head of the one or more heads to write data in a zone of tracks on the first surface; and in response to finishing the writing of data in the zone of tracks during the write operation, redistributing the lubricant in the finished zone of tracks by radially moving the head across the finished zone of tracks before continuing the write operation in a different zone of tracks.

22. The method of claim 21, further comprising radially moving the head across the finished zone of tracks multiple times in succession before continuing the write operation in the different zone of tracks.

23. The method of claim 21, further comprising logging a redistribution of lubricant for the finished zone of tracks.

* * * * *